United States Patent
Franklin

(10) Patent No.: US 7,703,740 B1
(45) Date of Patent: Apr. 27, 2010

(54) CLOG RESISTANT PILOT VALVE

(76) Inventor: Robert C. Franklin, 15400 Winchester Blvd., #42, Los Gatos, CA (US) 95030

( * ) Notice: Subject to any disclaimer, the term of this patent is extended or adjusted under 35 U.S.C. 154(b) by 0 days.

(21) Appl. No.: 12/381,107

(22) Filed: Mar. 6, 2009

(51) Int. Cl.
*F16K 31/12* (2006.01)

(52) U.S. Cl. .................. 251/30.03; 251/39; 251/129.21

(58) Field of Classification Search ... 251/30.01–30.03, 251/30.05, 129.21, 38, 39
See application file for complete search history.

(56) References Cited

U.S. PATENT DOCUMENTS

| | | | | |
|---|---|---|---|---|
| 2,710,162 A | * | 6/1955 | Snoddy | 251/30.05 |
| 3,476,146 A | * | 11/1969 | Dolter | 251/30.03 |
| 3,593,957 A | | 7/1971 | Dolter | |
| 4,081,171 A | * | 3/1978 | Morgan et al. | 251/30.02 |
| 4,896,692 A | * | 1/1990 | Baun | 251/30.02 |
| 5,269,333 A | | 12/1993 | Richmond | |
| 7,082,959 B1 | | 8/2006 | Franklin | |

* cited by examiner

*Primary Examiner*—John K Fristoe, Jr.
*Assistant Examiner*—Andrew J Rost
(74) *Attorney, Agent, or Firm*—Robert Charles Hill

(57) ABSTRACT

A clog resistant, pilot operated pilot valve having two fluid paths, one path for fluid flow from the valve input to the valve output, and the second path for fluid flow through input and output pilot apertures. The opening and closing of the pilot apertures controls the flow of fluid between the input and output of the pilot valve. A clog resistant pilot operated valve in which fluid flows through the pilot fluid path only during the time of transition from an valve open to a valve closed condition, or vice-versa, thereby reducing the probability of failure due to contaminants blocking the pilot activation path. A clog resistant pilot operated valve in which the plunger, used to open and close the pilot fluid paths, is ribbed in construction to reduce the probability that contaminants will cause seizure of the plunger movement.

8 Claims, 5 Drawing Sheets

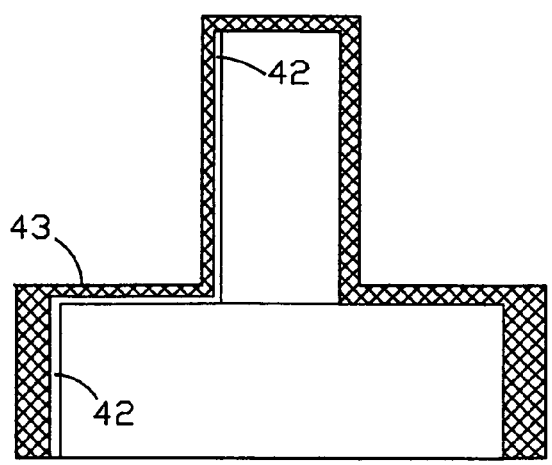
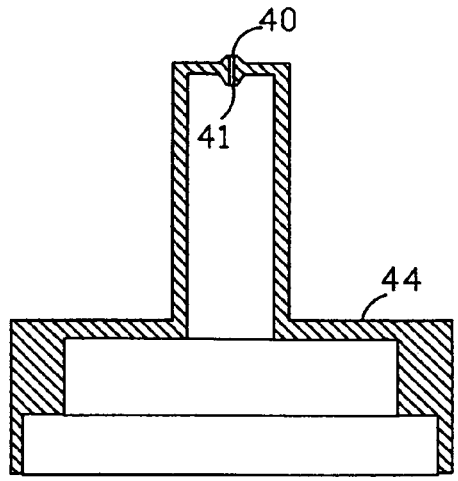
FIG. 5A  FIG. 6A
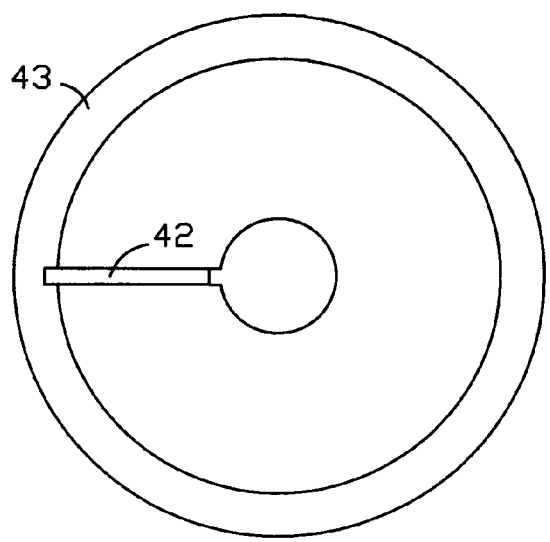
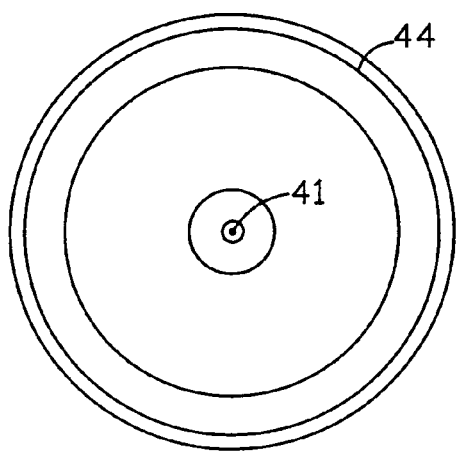
FIG. 5B  FIG. 6B

CLOG RESISTANT PILOT VALVE

FIELD OF INVENTION

This invention relates to pilot valve design improvements that will reduce the pilot valve failure rate due to clogging of pilot apertures and other fluid passages. Pilot valves, especially solenoid activated pilot valves, are in extensive use in applications such as dishwashing, clothes washing, and ice making machines, to name a few. Although the failure rate is quite low, on the order of four percent, many applications can cause catastrophic results if the valve fails to operate properly. As an example, if the water inlet valve used in a clothes washing machine fails to close, it can result in flooding of the surrounding area and extensive property damage.

DESCRIPTION OF PRIOR ART

There have been numerous patents issued dealing with pilot operated valves and subsequent improvements to reduce valve failure due to contaminants becoming lodged in the pilot apertures. Pilot valves operate on the principle of opening and closing an output pilot aperture that is part of a flexible diaphragm assembly, that in turn opens and closes the main fluid passage between the valve input and output ports. The valve input port is normally connected to the source of fluid, such as a faucet or the like. The valve output port is normally connected to an appliance, such as a clothes washing machine or dishwashing machine. An input pilot aperture, to be described later, allows fluid to enter a pilot chamber for the purpose of supplying fluid necessary to force the flexible diaphragm to a valve closed condition. This occurs when the output pilot aperture is closed to fluid flow by the de-energizing of a solenoid-controlled plunger. As with all pilot operated valves, the input pilot aperture is always smaller in area than the output pilot aperture to allow a larger volume of fluid to escape through the output pilot aperture than can flow through the input pilot aperture. This principle is discussed in detail in numerous pilot valve patents. It will also be described later that blocking of the input pilot aperture by contaminants can result in failure of the pilot valve to properly close, resulting in possible property damage. With this in mind, many design improvements have been patented to reduce the possibility of pilot aperture clogging by contaminants that may exist in the fluids that are being controlled by the pilot valve. U.S. Pat. No. 3,593,957 issued to Dolter et al on Jul. 20, 1971 describes a pilot operated valve that utilizes small filter holes incorporated in the flexible diaphragm assembly to reduce the possibility of contaminants lodging in the input pilot aperture of the valve. This feature, or variations thereof, have been incorporated extensively in pilot valves that are in use today. Although it does offer an advantage over previous designs, experience has indicated that, because of the size of the filter holes and the limited number of holes provided, the contamination of the filter holes does occasionally cause failure of the pilot valve to close properly. One variation incorporates twelve holes molded into the rubber diaphragm, each hole being on the order of twenty-five thousandths of an inch in diameter. In such designs, when the pilot valve is in an open condition; allowing fluid to flow between its input and output ports, there will be continuous fluid flow through the filter holes and both the input and output pilot apertures. This continuous flow provides the opportunity for any fluid contaminants to clog the filter holes.

Richmond, in U.S. Pat. No. 5,269,333 issued Dec. 14, 1993 addresses the above problem by partially blocking fluid flow through the pilot apertures when the pilot valve is in an open condition, allowing fluid to flow from the input to the output ports. To accomplish this partial blocking of fluid flow through the input pilot aperture, an actuation chamber opening is molded into the diaphragm valve seat. When the diaphragm valve seat is pushed against the surface of the guide tube it substantially closes the pilot aperture to fluid flow. As described in the patent, the surface that the diaphragm valve seat encounters is slightly roughened to allow a micro-flow of fluid through the input pilot aperture. This micro-flow is necessary to allow the valve to change forth an open condition to a closed condition when the solenoid is de-energized and the associated plunger closes the output pilot aperture.

There are two problems that become apparent when observing the design of Richmond. The first problem is the fact that a micro-flow is required, which allows continuous fluid flow through the pilot apertures when the pilot valve is open to fluid flow. Although the flow rate is small it still presents the opportunity for contaminants to clog the pilot apertures. Secondly, because the position of the actuation chamber opening is a function of the extension of the diaphragm in an upward direction, as shown in the Richmond patent drawings, FIG. 2 and FIGS. 9 through 12, there can be a condition in which the diaphragm does not travel to a point at which the actuation chamber opening will be substantially closed. This will occur when the fluid flow rate at the output of the pilot valve is restricted to an amount that is considerably less than the flow rate that would occur without any significant restriction. For example, the flow of water through a pilot valve that controls the water supply to a refrigerator ice-maker would be considerably less than a full flow situation normally encountered in a clothes washing machine. In this condition there would be insufficient fluid flow through the valve to cause the diaphragm to reach a position that would close the flow to the actuation chamber. Therefore, this condition would allow continuous fluid flow through the pilot apertures during the time when the pilot valve is in a open condition, thereby defeating the purpose of the design improvement. The present invention overcomes these two shortcomings and thus reduces the probability of clogging of the pilot apertures.

U.S. Pat. No. 7,082,959 issued on Aug. 1, 2006 to Franklin involves the use of a pilot valve design that functions without the use of a solenoid. Franklin uses a permanent magnet configuration to close the outlet pilot aperture and thus close the valve to fluid flow when a water leak is detected as a result of the water hose failure or the like. It will be shown that the present invention is also applicable to the Franklin invention.

SUMMARY OF INVENTION

The present invention involves two improvements to existing pilot valve technology. First, this invention reduces the probability of pilot valve failure by totally blocking fluid flow through the pilot apertures when the pilot valve is in an open condition, allowing fluid to flow from the valve input port to the output port. Fluid will flow through the input pilot aperture only during the transition from a valve open to valve closed condition. This typically occurs within a fraction of a second. As part of this first improvement, the fluid filter provision of the input pilot aperture is moved from the standard location in the flexible diaphragm assembly to a location adjacent to the valve input port. This provision not only allows the use of standard filter screen material, that provides a larger number of effective filter holes, but also places the filter in a location in which higher velocity fluid flow will tend to reduce the accumulation of contaminant materials on the filter screen. The second improvement involves changing the physical shape of the plunger assembly that is used to open and close the outlet pilot aperture. Accumulation of contaminants between the outer diameter of the plunger assembly and the adjacent housing in which the plunger assembly moves has been shown to be another source of pilot valve failure. Such accumulation of contaminants can cause the plunger assembly to seize in a position that holds the pilot valve in either an open or closed condition. It will be seen later that adding a ribbed external surface to the plunger assembly will reduce the probability that contaminates can accumulate and restrict the movement of the plunger assembly.

DESCRIPTION OF DRAWINGS

FIG. 5A shows a cross-sectional side view of the pilot valve outer housing.

FIG. 5B shows a bottom view of the pilot valve outer housing.

FIG. 6A shows a cross-sectional side view of the pilot valve inner housing.

FIG. 6B shows a bottom view of the pilot valve inner housing.

DETAILED DESCRIPTION OF THE INVENTION

Figure 1:
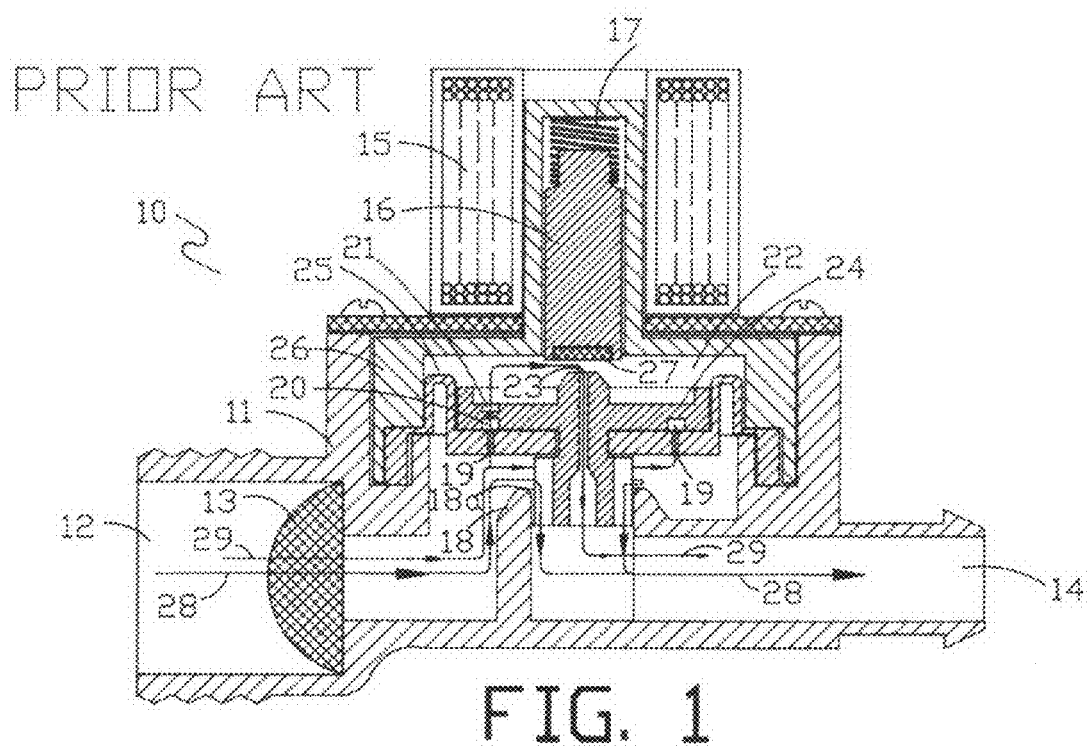
FIG. 1 shows a cross-sectional side view of a typical solenoid activated pilot valve that is open to fluid flow between the input and output ports.

FIG. 1 shows a typical pilot valve assembly 10 with a valve body 11 having an input port 12 with a filter screen 13 and an output port 14. In the present condition, solenoid 15 is assumed to be energized by an external voltage source, not shown: This causes the plunger assembly 16, fabricated from ferromagnetic material, to be pulled into the shown position by the magnetic field attraction generated by the energized solenoid 15. Spring 17 located on the top of plunger assembly 16 is now compressed as shown. The arrows 28 and 29 show two different fluid flow paths. The first arrow 28 shows fluid flow from the input port 12 through the filter screen 13, then over the lip 18a of main valve seat 18 and finally exiting through outlet port 14. Arrow 29 shows the second fluid flow path with fluid flowing through the input filter apertures 19 and into channel 20, then through input pilot aperture 21, where the fluid will enter the pilot chamber 22. As shown, the fluid continues its path through the outlet pilot aperture 23 which is part of the diaphragm support plate 24 and exits the bottom of the diaphragm support plate to the output port 14. Diaphragm 25 is comprised of a flexible elastic material, such as rubber, and serves as a compliant seal to press against the main valve seat 18 when the valve is closed. Additionally, when the pilot valve 10 changes from a valve closed to a valve open condition, diaphragm 25 acts as a flexible means allowing vertical movement of the diaphragm support plate 24 and the surface of diaphragm 25 that normally presses against the lip 18a of main valve seat 18 when the valve is closed. Diaphragm 25 will also provide a fluid seal between the pilot chamber 22, the input port 12, and output port 14 when the pilot valve is closed to fluid flow. Finally, housing 26 provides fluid containment for the pilot chamber 22 and also provides a guide cylinder in which plunger assembly 16 travels.

Figure 2:
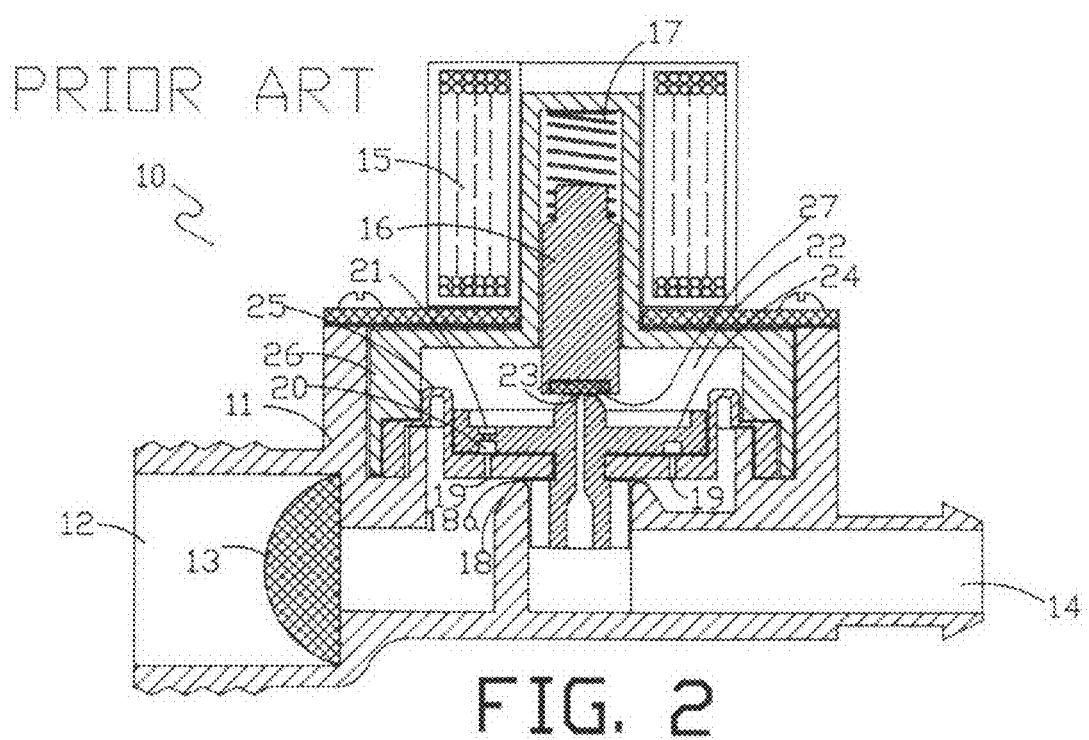
FIG. 2 shows a cross-sectional side view of a typical solenoid activated pilot valve that is closed to fluid flow between the input and output ports.

FIG. 2 again shows the typical pilot valve assembly 10 but now in a condition in which the valve is closed to fluid flow. To establish this condition, solenoid 15 is de-energized by removing the voltage source, not shown. Spring 17 now forces plunger assembly 16 in a downward direction to the position shown causing the rubber element 27, that is physically attached to the plunger assembly 16, to press against the output pilot aperture 23. This closes the output pilot aperture 23 to fluid flow. Fluid will continue to flow into the pilot chamber 22 via the input pilot aperture 21 until the pilot chamber 22 is filled, thereby building up additional fluid pressure within the pilot chamber 22, which aids in holding the diaphragm 25 against the valve seat 18. From the above description it can be seen that fluid flowing through the input filter apertures 19, input pilot aperture 21, and output pilot aperture 23, during the above described conditions, can present the opportunity for contaminant material to be deposited on these very small apertures and possibly result in premature failure of the pilot valve. Blockage of the outlet pilot aperture 23 will result in permanent closure of the pilot valve to fluid flow, no matter whether the solenoid 15 is energized or not. Blockage of all the input filter apertures 19 or of the input pilot aperture 21 would result in failure of the valve to close to fluid flow, again no matter whether the solenoid 15 is energized or not. Filter screen 13 is typically fabricated from a metal screen mesh that is sufficiently porous to filter larger contaminants, such as sand or the like, from entering the valve structure. A finer mesh screen would aid in reducing the amount of contaminants that might try to enter the pilot apertures, but it would also reduce the overall rate of fluid flow through the pilot valve. Therefore, the filter screen 13 acts as a primary filter, and input filter apertures 19 provide a secondary filter capability only for the pilot apertures.

Figure 3:
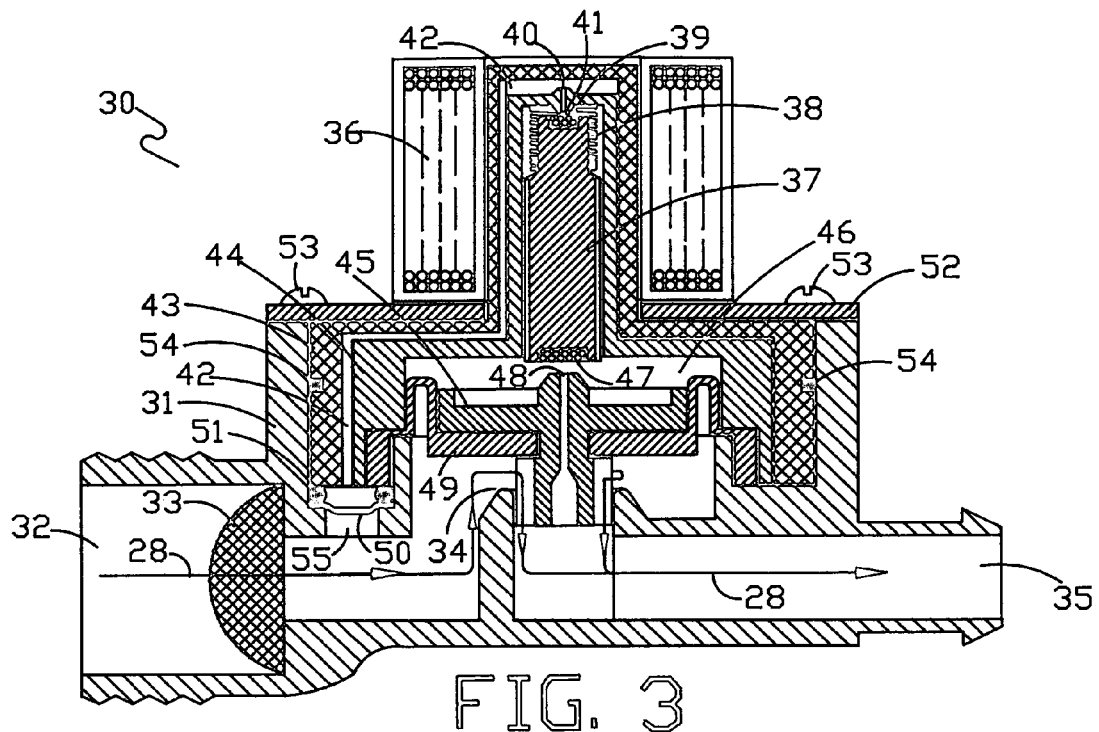
FIG. 3 shows a cross-sectional side view of a solenoid activated pilot valve that incorporates the improvements described in this invention and which is open to fluid flow between the input and output ports.

FIG. 3 shows a pilot valve assembly 30 that is similar to the pilot valve assembly 10, previously described, but is modified to contain the revisions intended to improve reliability. Pilot valve assembly 30 is shown with fluid flowing as shown by the arrow 28, that is, fluid enters the valve body 31 at input port 32 and flows through filter screen 33, then over the lip of valve seat 34 and through outlet port 35. Solenoid 36 is energized by a voltage source, not shown. As previously described, the magnetic field generated by solenoid 36 pulls the ferromagnetic plunger assembly 37 to the position shown and, in doing so, compresses spring 38. The elastic element 39 presses against the input pilot aperture 41 thereby closing it to any fluid flow. Input pilot aperture 41 is in fluid communication with aperture 40, both of which are physically part of the inner housing 44. Outer housing 43 encloses the inner housing 44 and, with O-ring 54, provides a fluid-tight housing for the components within the valve body 31. Retainer plate 52, in conjunction with fasteners 53, provide the necessary containment of the outer housing 43. Physically, the inside diameter of outer housing 43 and the outside diameter of inner housing 44 are manufactured to provide a close tolerance fit between the two housings. Channel 42 is formed as part of the outer housing 43 and provides a narrow path for fluid flow between the inner housing 44 and the outer housing 43. The construction of the two housings will be described in more detail in FIG. 5A, 5B, 6A, and 6B. It should be noted that the diaphragm 49 has no filter holes as was the case in the previous diaphragm described in FIG. 1 and FIG. 2. Also the diaphragm support plate 45 only contains an output pilot aperture 48. In order to supply fluid to the pilot chamber 46 at the appropriate time, when the pilot valve 30 is switched from an open to a closed condition, a path is provided through opening 55 and through secondary filter screen 50 to the channel 42. O-ring 51 holds the secondary filter screen 50 in position and seals against any contaminants that might attempt to bypass the secondary filter screen 50.

Figure 4:
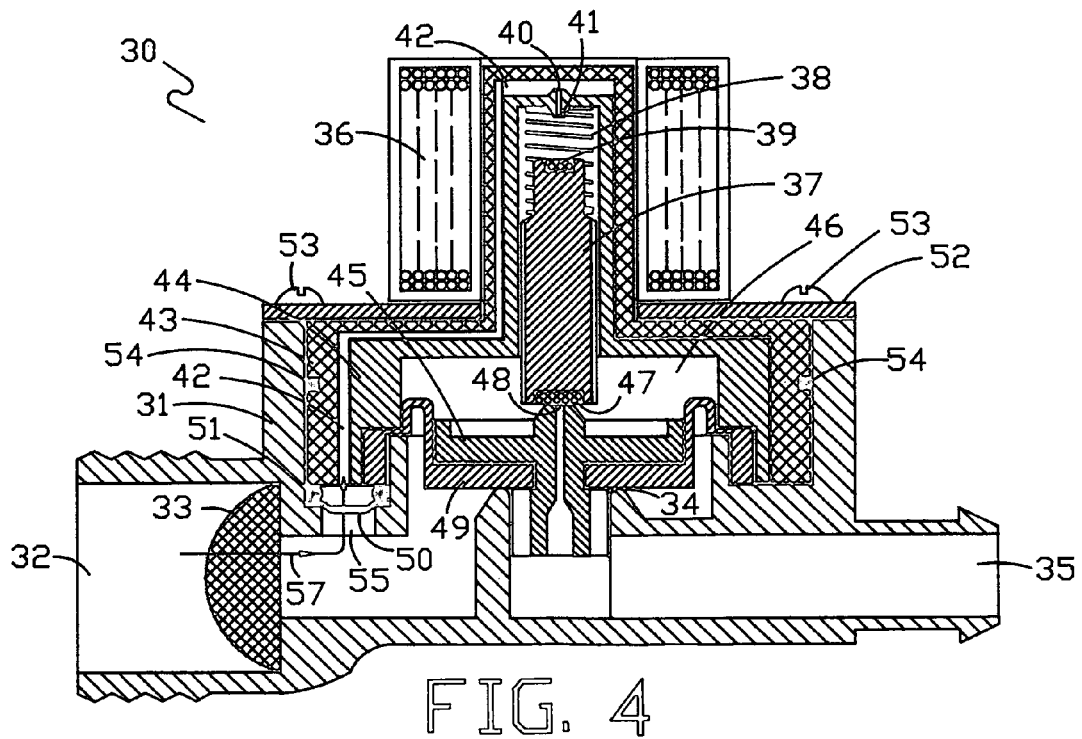
FIG. 4 shows a cross-sectional side view of a solenoid activated pilot valve that incorporates the improvements described in this invention and which is closed to fluid flow between the input and output ports.

FIG. 4 shows the pilot valve 30 after the solenoid 36 has been de-energized, allowing the spring 38 to force the plunger assembly 37 in a downward direction, allowing elastic element 47 to close the output pilot aperture 48. During the time in which the diaphragm 49 and the diaphragm support plate 45 are in transition from the position described in FIG. 3 to the present position, fluid will flow as shown by arrow 57 through the opening 55 and the secondary filter screen 50, then through the channel 42, aperture 40 and pilot aperture 41. Next, fluid will flow past the outer diameter of the plunger assembly 37 and enter the pilot cavity 46 where it will exert the necessary pressure to sustain the diaphragm 49 against the lip of the valve seal 34 surface. At this point, fluid flow into the pilot cavity 46 will cease.

FIG. 5A shows a cross-sectional side view of the outer housing 43 with the channel 42 formed in the inner diameter. FIG. 5B shows a bottom view of the outer housing to more clearly depict the location of the channel 42.

FIG. 6A shows a cross-sectional side view of the inner housing 44 with the aperture 40 and the input pilot aperture 41 located at the upper end of the housing. FIG. 6B is a bottom view of the inner housing 44 with the input pilot aperture 41 centered at the upper end of the housing.

Figure 7A:
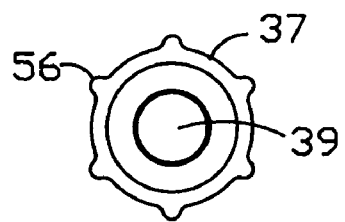
FIG. 7A shows the top end view of the pilot valve plunger assembly.
Figure 7B:
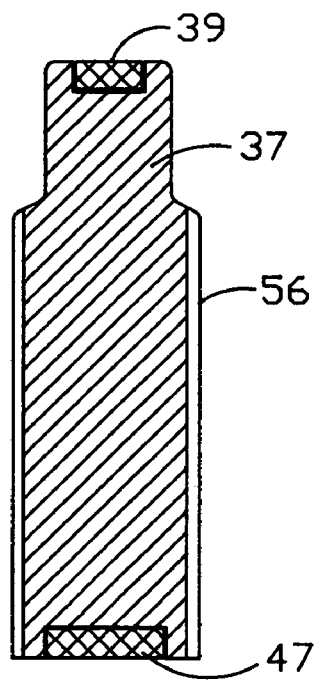
FIG. 7B shows a cross-sectional side view of the pilot valve plunger assembly.
Figure 7C:
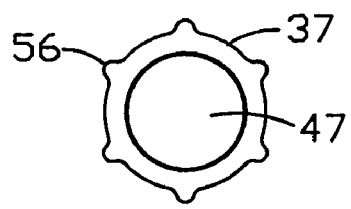
FIG. 7C shows the bottom end view of the pilot valve plunger assembly.

FIG. 7A is an enlarged end view of the plunger assembly 37 showing the ribs 56 extending from the outer circumference. These ribs 56 accomplish two functions, namely, they provide a guide surface for the plunger assembly 37 to move within the inner diameter of the inner housing 44, with the area between the ribs 56 allowing sufficient volume for fluid to pass into the pilot cavity 46. Secondly, they reduce the probability that contaminants can accumulate between the wall of the inner housing 44 and the outer diameter of the plunger assembly 37. Since the secondary filter screen 50 shown in FIGS. 3, 4, 7 and 9 is typically designed to stop passage of contaminants larger than twenty thousandths of an inch in diameter, the height of each rib 56 extending from the plunger assembly 37 body is on the order of forty thousandths of an inch. The tip of each rib 56 is rounded not only to reduce the friction encountered as the plunger assembly 37 slides within the housing 44, but also to reduce the probability the contaminants can become lodged between the surface of housing 44 and the tip of a rib 56. The plunger is fabricated from a ferromagnetic material when it is used in a solenoid controlled pilot valve application. When used in an application as described in the Franklin patent the plunger assembly is fabricated from a non-magnetic metal or plastic material. FIG. 7B is a cross-sectional side view of the plunger assembly 37 showing the location of the elastic element 39 used to seal the input pilot aperture 41, and the elastic element 47 used to seal the output pilot aperture 48. FIG. 7C shows the bottom view of the plunger assembly 37 and the location of the rubber element 47.

Figure 8:
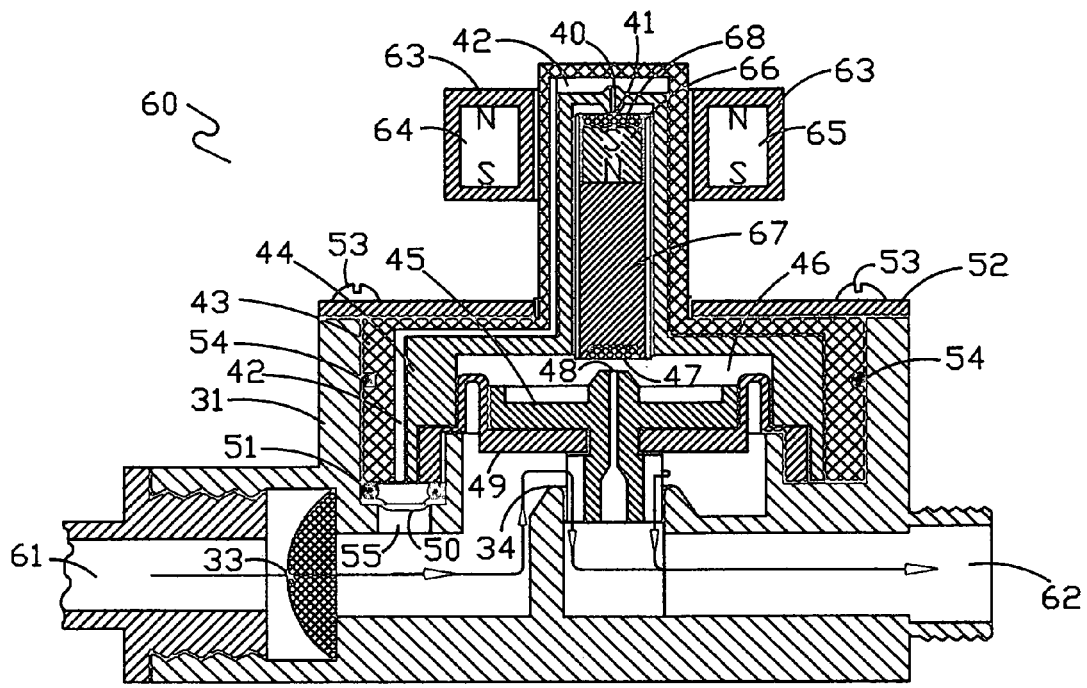
FIG. 8 shows a cross-sectional side view of a magnet activated pilot valve that incorporates the improvements described in this invention and which is open to fluid flow between the input and output ports.

The descriptions to this point have pertained to solenoid activated pilot valves. FIG. 8 shows a pilot valve configuration in which permanent magnets are used to determine the position of a plunger assembly that opens and closes the pilot apertures. The present invention represents a different location of the pilot apertures and the plunger assembly from that described in the Franklin patent. The objective of the Franklin patent is to provide a pilot valve system that would normally be open to fluid flow, but would be closed in the event a water soluble sensor detected the presence of water, and would thereby trigger a spring loaded mechanism to move the position of a magnet assembly and cause the valve to close. The structure of FIG. 8 shows a pilot valve 60 incorporating the improvements pertaining to this invention, with the exception that the magnet activation means replaces the solenoid system. Since the inner pilot valve activation remains the same as previously described it will not be described again in detail. In FIG. 8 the pilot valve 60 is shown being open to fluid flow from input port 61 to output port 62. Magnet assembly 63 contains two magnets, 64 and 65 with their magnetic polarities as shown. The position of these magnets is such that they attract the magnet 66, enclosed as part of plunger assembly 67, to the position shown. The elastic element 68, which is part of the plunger assembly 67, will now press against the input pilot aperture 41, closing it to fluid flow in a manner previously described.

Figure 9:
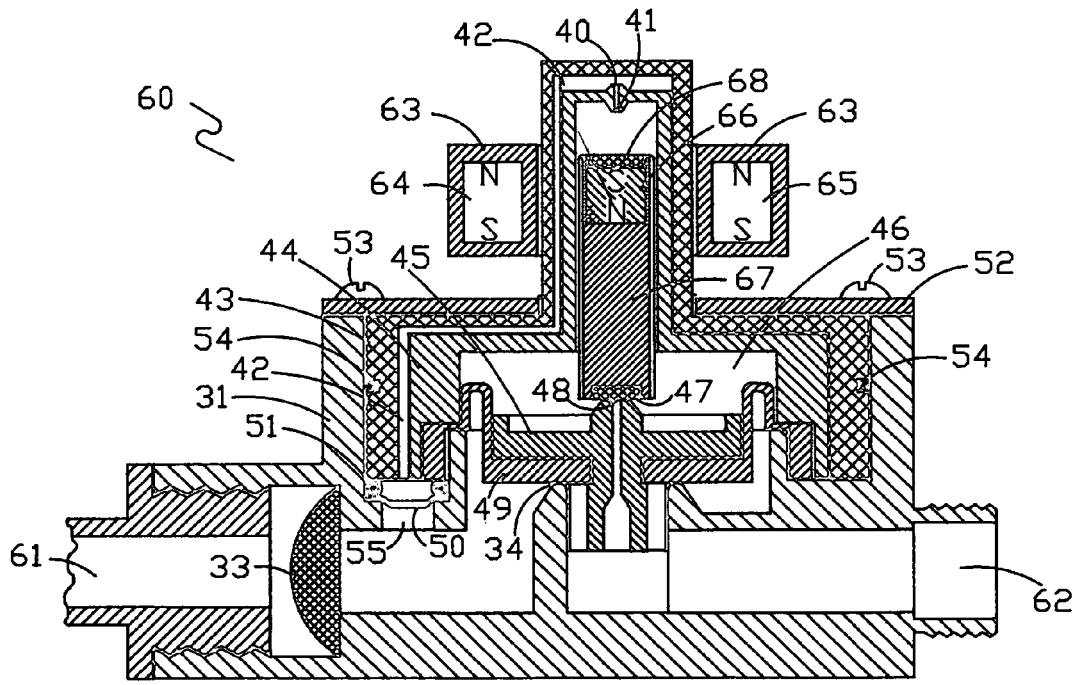
FIG. 9 shows a cross-sectional side view of a magnet activated pilot valve that incorporates the improvements described in this invention and which is closed to fluid flow between the input and output ports.

FIG. 9 shows the pilot valve 60 in a condition in which it blocks fluid flow between the input port 61 and output port 62. Closure of the valve to fluid flow is once again accomplished by changing the position of the plunger assembly 67 such that elastic element 47 presses against the outlet pilot aperture 48. The position of plunger assembly 67 is changed by a spring-loaded mechanism (not shown) that forces the magnet assembly 63 to the lower position. In the Franklin patent the spring-loaded mechanism is triggered when a water-soluble element, located in a separate sensor, dissolves in the presence of water. A flexible cable links the separate sensor with the spring-loaded mechanism that is part of the pilot valve assembly. It can be seen, therefore, that the valve 60 will be opened and closed to fluid flow by simply changing the position of the magnet assembly 63.

In summary, this invention describes several improvements over the prior art. First of all, the probability that contaminants will enter the pilot apertures is greatly reduced by opening the path for fluid flow through the input pilot aperture only during the interval when fluid is required to fill the pilot cavity. This interval typically involves only a fraction of a second, whereas the existing pilot valves used today allow fluid to flow through the pilot ports during the entire time that the pilot valve is open to fluid flow, thereby increasing the probability that contaminants will plug the pilot apertures. In addition, replacing the standard filter holes normally found in the rubber diaphragm described herein with a metal mesh screen 50 or the like not only increases the effective number of screen holes available, but also allows the use of smaller screen holes. The position of this pilot screen is important in that it is located at a point in the path of fluid flow through the valve in which the fluid velocity is relatively high, thereby reducing the probability that contaminants will accumulate on the pilot screen. Finally, by configuring the plunger assembly such that its outside surface has a ribbed structure the probability that contaminants will accumulate between the surface of the enclosure circumference and the plunger outside surface will be greatly reduced. Experience has revealed that such contamination has been a large contributing factor to pilot valve failure. It should be understood that, while this disclosure describes the use of a ribbed plunger associated with the pilot valve improvements, the use of a ribbed plunger in other pilot valve designs should not depart from the spirit of this invention. While the above description pertains to two applications of pilot valve designs it should be understood that other versions of this design could be used without departing from the spirit of this invention. The description of this invention is illustrative and not limiting; further modifications will be apparent to one skilled in the art, in the light of this disclosure and the appended claims.

What is claimed is:

1. A pilot operated valve with clog resistant capabilities comprising;

a valve body having an input port and an output port which are in fluid communication, said input port being connected to a water supply and said output port connected to an appliance;

a main fluid flow through said valve body and a restricted fluid flow through said valve body;

a sealing member movable within said valve body between an open position wherein said sealing member does not block main fluid flow, and a closed position wherein said sealing member blocks main fluid flow;

an input pilot aperture for the restricted fluid flow in fluid communication with a reservoir, the output of which is in communication with an output pilot aperture that is of a larger area than the input pilot aperture;

a pilot fluid path that is in communication with the input to said input pilot aperture and is independent of said sealing member;

an input to said pilot fluid path that is in proximity to said input port;

a plunger made of ferromagnetic material being moveable within a pilot cavity enclosure with a first elastic sealing element at a first end of said plunger providing a means of blocking fluid flow through said input pilot aperture when said plunger is at one limit of its allowable movement, and a second elastic sealing element at the second end of said plunger to block fluid flow through said output pilot aperture when said plunger is at the other limit of its allowable movement; and a pilot operated valve in which the position of said plunger is controlled by a solenoid such that when said solenoid is in an energized state said plunger moves to a position where said first elastic element on said first end of said plunger blocks fluid flow through said input pilot aperture, and when said solenoid is in a de-energized state said plunger moves to a position where said second elastic element blocks fluid flow through said output pilot aperture; wherein a pilot fluid path is provided for fluid flow to said input pilot aperture by fitting an inner housing within an outer housing, said outer housing having a channel fabricated on its inner surface to allow fluid to flow to said input pilot aperture.

2. A clog resistant pilot valve of claim 1 in which a fluid filter is located at the entry to the input of said pilot fluid path.

3. A clog resistant pilot valve of claim 1 in which said plunger is configured to have an outer surface consisting of a plurality of rib protrusions spaced around the circumference of said plunger, with said rib protrusions spanning along the outermost diameter of said plunger in a longitudinal direction, with the outer surface of each said rib protrusion providing a guiding contact with the enclosure in which said plunger moves, and the surface of said plunger between rib protrusions providing a path for fluid flow.

4. A pilot operated valve with clog resistant capabilities comprising;

a valve body having an input port and an output port which are in fluid communication, said input port being connected to a water supply and said output port connected to an appliance;

a main fluid flow through said valve body and a restricted flow through said valve body;

a sealing member movable within said valve body between an open position wherein said sealing member does not block main fluid flow, and a closed position wherein said sealing member blocks main fluid flow;

an input pilot aperture for the restricted fluid flow in fluid communication with a reservoir, the output of which is in communication with an output pilot aperture that is of a larger area than the input pilot aperture;

a pilot fluid path that is in communication with the input to said input pilot aperture and is not part of said sealing member;

an input to said pilot fluid path that is in proximity to said input port;

a plunger made of non-magnetic material being moveable within a pilot cavity enclosure with a permanent magnet and a first elastic sealing element enclosed within a first end of said plunger with said first elastic sealing element providing a means of blocking fluid flow through said input pilot aperture when said plunger is at one limit of it allowable movement, and a second elastic sealing element at the second end of said plunger to block fluid flow through said output pilot aperture when said plunger is at the other limit of its allowable movement; and a pilot operated valve in which the position of said plunger is controlled by the position of a permanent magnet assembly that is external to the pilot cavity and moveable in a manner such that when said permanent magnet assembly is in a first position it causes the magnet and hence said plunger to move to a position where said first elastic element on said first end of said plunger blocks fluid flow through said input pilot aperture, and when said permanent magnet assembly moves to a second position it causes the magnet and hence said plunger to move to a position where said second elastic element blocks fluid flow through said output pilot aperture; wherein a pilot fluid path is provided for fluid flow to said input pilot aperture by fitting an inner housing within an outer housing, said outer housing having a channel fabricated on its inter surface to allow fluid to flow to said input pilot aperture.

5. A clog resistant pilot valve of claim 4 in which a fluid filter is located at the entry to the input of said pilot fluid path.

6. A clog resistant pilot valve of claim 4 in which said plunger is configured to have an outer surface consisting of a plurality of rib protrusions spanning along the outermost diameter of said plunger in a longitudinal direction, with the outer surface of each said rib protrusion providing a guiding contact with the enclosure in which said plunger moves, and the surface of said plunger between said ribs providing a path for fluid flow.

7. A pilot operated valve of claim 6 in which said rib protrusions on said plunger have a rounded surface at the tip of said rib protrusions.

8. A pilot operated valve of claim 6 wherein the height of each rib protrusion is on the order of forty thousandths of an inch.

* * * * *